United States Patent
Wang et al.

(10) Patent No.: US 12,551,425 B2
(45) Date of Patent: *Feb. 17, 2026

(54) AQUEOUS ZINC ORAL CARE COMPOSITIONS WITH FLUORIDE

(71) Applicant: Solventum Intellectual Properties Company, Maplewood, MN (US)

(72) Inventors: Yizhong Wang, Woodbury, MN (US); Tiffany T. Ton, Woodbury, MN (US); Richard P. Rusin, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 821 days.

This patent is subject to a terminal disclaimer.

(21) Appl. No.: 17/789,430

(22) PCT Filed: Dec. 29, 2020

(86) PCT No.: PCT/IB2020/062516
§ 371 (c)(1),
(2) Date: Jun. 27, 2022

(87) PCT Pub. No.: WO2021/137154
PCT Pub. Date: Jul. 8, 2021

(65) Prior Publication Data
US 2023/0338261 A1   Oct. 26, 2023

Related U.S. Application Data

(60) Provisional application No. 62/955,975, filed on Dec. 31, 2019.

(51) Int. Cl.
| | | |
|---|---|---|
| A61K 8/58 | (2006.01) | |
| A61K 8/19 | (2006.01) | |
| A61K 8/21 | (2006.01) | |
| A61K 8/44 | (2006.01) | |
| A61Q 11/00 | (2006.01) | |

(52) U.S. Cl.
CPC ............. *A61K 8/58* (2013.01); *A61K 8/19* (2013.01); *A61K 8/21* (2013.01); *A61K 8/44* (2013.01); *A61Q 11/00* (2013.01)

(58) Field of Classification Search
CPC .................. A61K 6/20; A61Q 11/00
USPC ................................... 32/59, 2, 58
IPC ........................................ A61Q 11/00
See application file for complete search history.

(56) References Cited

U.S. PATENT DOCUMENTS

| | | | | |
|---|---|---|---|---|
| 3,964,166 | A | * | 6/1976 | Stahlman ............... A61Q 11/00 433/166 |
| 4,289,755 | A | | 9/1981 | Dhabhar |
| 5,587,147 | A | | 12/1996 | Domke et al. |
| 10,639,242 | B1 | * | 5/2020 | Latta ........................ A61K 8/21 |
| 2015/0305993 | A1 | | 10/2015 | Rege |

FOREIGN PATENT DOCUMENTS

| | | |
|---|---|---|
| CN | 104822362 A | 8/2015 |
| CN | 105828783 A | 8/2016 |
| CN | 104853723 B | 12/2017 |
| EP | 0074082 B1 | 10/1987 |
| JP | 2018188427 A | 11/2018 |
| WO | 2014098822 A1 | 6/2014 |
| WO | 2014098826 A1 | 6/2014 |
| WO | 2014204439 A1 | 12/2014 |
| WO | 2015094254 A1 | 6/2015 |

OTHER PUBLICATIONS

Hu, "A Clinical Investigation of the Efficacy of a Dual Zinc plus Arginine Dentifrice for Controlling Oral Malodor", The Journal of Clinical Dentistry, Sep. 2018, vol. 29, No. 3, pp. A41-A45.
International Search Report for PCT International Application No. PCT/IB2020/062516, mailed on Apr. 23, 2021, 3 pages.
Prasad, "The Effects of Two New Dual Zinc plus Arginine Dentifrices in Reducing Oral Bacteria in Multiple Locations in the Mouth: 12-Hour Whole Mouth Antibacterial Protection for Whole Mouth Health", The Journal of Clinical Dentistry, Sep. 2018, vol. 29, No. 3, pp. A25-A32.

* cited by examiner

*Primary Examiner* — Walter E Webb

(57) ABSTRACT

A dental composition is described that includes a homogenous solution having a stabilized zinc complex with amine-containing ligands and a source of fluoride anions. Also described are methods for treating or preventing caries activity at a tooth surface employing the dental composition, and kits re the same.

20 Claims, No Drawings

AQUEOUS ZINC ORAL CARE COMPOSITIONS WITH FLUORIDE

CROSS REFERENCE TO RELATED APPLICATIONS

This application is a national stage filing under 35 U.S.C. 371 of PCT/IB2020/062516, filed Dec. 29, 2020, which claims the benefit of Provisional Application No. 62/955,975, filed Dec. 31, 2019, the disclosures of each of which are incorporated by reference herein in their entireties.

BACKGROUND

Dental caries is a disease in which tooth decay results from interaction with acid produced by bacteria. Silver salts are known to have antibacterial properties and fluoride salts are known to remineralize tooth surfaces. Both silver and fluoride compositions have separately been shown to aid in preventing and arresting caries activities.

Silver diamine fluoride has been used to treat surfaces affected by caries; however, reaction with saliva causes the formation of silver phosphate. Silver phosphate is light sensitive and permanently stains teeth black when exposed to light. Silver fluoride (without a diamine stabilizer) is extremely unstable in aqueous solutions and quickly decomposes to form metallic silver.

Zinc salts are also known to have antibacterial properties and do not suffer from light sensitivity, i.e., zinc complexes do not turn black upon exposure to light. Together, zinc and fluoride have the potential to create a promising caries treatment. However, zinc fluoride, as well as other zinc complexes, are not soluble in aqueous solutions. In fact, zinc fluoride will often precipitate out of solution even if water-soluble zinc precursors are employed.

What is needed is a way to formulate an aqueous solution of zinc and fluoride to treat caries activity. The present disclosure describes a dental composition providing a zinc complex stabilized with amine-containing ligands in an aqueous solution with fluoride ions.

SUMMARY

In one embodiment, a dental composition is described. The dental composition may include a zinc carboxylate, an amine-containing ligand, a source of fluoride anion effective to provide fluoride in an amount of at least 4 wt % with respect to the weight of the dental composition, and water. The dental composition may have a pH of at least 8 and be a homogenous solution at a temperature of about 20-25° C.

In one embodiment, a method for treating or preventing caries activity on a tooth surface is described. The method may include providing a dental composition including a zinc carboxylate, an amine-containing ligand, a source of fluoride anion effective to provide fluoride in an amount of at least 4 wt % with respect to the weight of the dental composition, and water. The dental composition may have a pH of at least 8 and be a homogenous solution at a temperature of about 20-25° C. The method may include contacting the dental composition to the tooth surface.

In one embodiment, a kit is described. The kit may include a dental composition including a zinc carboxylate, an amine-containing ligand, a source of fluoride anion effective to provide fluoride in an amount of at least 4 wt % with respect to the weight of the dental composition, and water. The dental composition may have a pH of at least 8 and be a homogenous solution at a temperature of about 20-25° C. The method may include contacting the dental composition to the tooth surface. The kit may further include instructions directing a user to perform a method of providing the dental composition and contacting the dental composition to a tooth surface.

DETAILED DESCRIPTION

As used herein, "about" means±10 percent of a given value. For example, about 10 means 9 to 11.

As used herein, "zinc carboxylate" means a zinc complex having one or more carboxylate ligands, e.g., —OC(O)—R.

As used herein, "homogenous solution" refers to a visually clear or transparent solution. No particulates or cloudiness is observed in the homogenous solutions described herein. A homogenous solution excludes dispersions, suspension, and the like.

Dental Compositions

In many embodiments, a dental composition is described. The dental composition may include a zinc carboxylate, an amine-containing ligand, a source of fluoride anion effective to provide fluoride in an amount of at least 4 wt % with respect to the weight of the dental composition, and water. The dental composition may have a pH of at least 8 and be a homogenous solution at a temperature of about 20-25° C.

In some embodiments, the dental composition may consist essentially of the zinc carboxylate, the amine-containing ligand, the source of fluoride, and water. In fact, no thickener, silica, or polymer vehicle may be required.

In some embodiments, the zinc carboxylate is present in an amount effective to provide zinc in a wt % with respect to the weight of the dental composition of about 5 wt % to about 15 wt %. For example, the zinc carboxylate may provide in zinc in a wt % with respect to the weight of the composition of about 5, 6, 7, 8, 9, 10, 11, 12, 13, 14, or 15, or a value within a range between any of the preceding values, for example, between about 8 and about 15, between about 10 and about 12, or the like.

In some embodiments, the amine-containing ligand is present in an amount between about 5 wt % to about 30 wt % with respect to the weight of the dental composition. For example, the amine-containing ligand may be present in amount in wt % of about 5, 6, 7, 8, 9, 10, 12, 14, 16, 18, 20, 22, 24, 26, 28, or 30, or a value within a range between any of the preceding values, for example, between about 8 and about 16, between about 10 and about 15, or the like.

In some embodiments, the zinc carboxylate and amine-containing ligand are present in amounts to provide a mol ratio of about 1:2 to about 1:3. In some embodiments, the mol ratio is 1:2. In other embodiments, the mol ratio is greater than 1:2.

In some embodiments, the source of fluoride anion is present in an amount to provide an effective amount of fluoride in an amount of at least about 10 wt %, at least about 15 wt %, or at least about 20 wt % with respect to the weight of the dental composition.

In some embodiments, the source of fluoride anion is present in an amount to provide an effective amount of fluoride in an amount from about 4 wt % to about 20 wt %. For example, the source of fluoride anion may provide fluoride in an amount in wt % with respect to the weight of the dental composition of about 4, 6, 8, 10, 12, 14, 16, or 20, or a value within a range between any of the preceding values, for example, between about 14 and about 10, or between about 8 and about 16, or the like.

In some embodiments, the water is present in an amount of about 20 wt % to about 50 wt 10% with respect to the weight of the dental composition. For example, the water may be present in an amount of about 20, 22, 24, 26, 28, 30, 32, 34, 36, 38, 40, 42, 44, 46, 48, or 50, or a value within a range between any of the preceding values, for example between about 28 and about 50, between about 36 and about 40, or the like.

In some embodiments, the pH of the dental composition may be at least 8, at least 9, at least 10, at least 11, or at least 12. In some embodiments, the dental composition may have a pH of about 8 to about 10. In some embodiments, the pH may be 9.

Zinc Carboxylate

In some embodiments, the zinc carboxylate is selected from one or more of zinc citrate, zinc gluconate, zinc maleate, zinc acetate, zinc fumarate, zinc adipate, and zinc propionate.

In some embodiments, the zinc carboxylate is zinc citrate.

Amine-Containing Ligand

In some embodiments, the amine-containing ligand may include one or more of an amino acid and ammonia.

In some embodiments, the amine-containing ligand may include one or more amino acid.

In some embodiments, the amine-containing ligand is selected from one or more of histidine, isoleucine, leucine, lysine, tyrosine, tryptophan, methionine, phenylalanine, aspartic acid, glycine, arginine, glutamic acid, valine, alanine, threonine, cysteine, proline, and asparagine.

In some embodiments, the amine-containing ligand may be arginine.

In some embodiments, the amine-containing ligand is ammonia ($H_3N$).

In other embodiments, the amine-containing ligand may include an amine of the formula $R_3N$, wherein one or more R is a $C_{1-4}$ alkyl.

Fluoride Anion Source

In some embodiments, the source of fluoride anion is selected from one or more of sodium fluoride, ammonium fluoride, silver fluoride, stannous fluoride, and potassium fluoride.

In some embodiments, the source of fluoride anion is selected from one or more of ammonium fluoride, silver fluoride, stannous fluoride, and potassium fluoride.

In other embodiments, the source of fluoride is not sodium fluoride.

In some embodiments, the source of fluoride anion is ammonium fluoride.

Methods for Treating or Preventing Caries Activity

In many embodiments, a method for treating or preventing caries activity on a tooth surface is described. The method may include providing a dental composition including a zinc carboxylate, an amine-containing ligand, a source of fluoride anion effective to provide fluoride in an amount of at least 4 wt % with respect to the weight of the dental composition, and water. The dental composition may have a pH of at least 8 and be a homogenous solution at a temperature of about 20-25° C. The method may include contacting the dental composition to the tooth surface.

In many embodiments, the dental composition may include any dental composition described herein.

In some embodiments, the method may further include allowing the dental composition to contact the tooth surface for a period of about 10 seconds to about 15 minutes. For example, the dental composition may be allowed to contact the tooth surface for a period of in seconds of about 10, 20, 30, 40, 50, 60, 90, 120, 150, 180, 210, 240, 300, 360, 420, 480, 540, 600, 660, 720, 780, 840, or 900, or a value within a range between any of the preceding values, for example, between about 30 and about 60, between about 90 and about 300, or the like.

In some embodiments the method may include applying the dental composition with a dropper, a needle, a pipette, a tray, or a swab.

Kits

In many embodiments, a kit is described. The kit may include a dental composition including a zinc carboxylate, an amine-containing ligand, a source of fluoride anion effective to provide fluoride in an amount of at least 4 wt % with respect to the weight of the dental composition, and water. The dental composition may have a pH of at least 8 and be a homogenous solution at a temperature of about 20-25° C. The method may include contacting the dental composition to the tooth surface. The kit may further include instructions directing a user to perform a method of providing the dental composition and contacting the dental composition to a tooth surface.

In some embodiments, the dental composition is provided as one part.

In other embodiments, the dental composition is provided as more than one part.

In some embodiments, the instructions may further direct a user to combine the more than one part to prepare the dental composition.

In some embodiments, the dental composition may include any dental composition described herein.

In some embodiments, the instructions may direct a user to conduct any method described herein.

EXAMPLES

Objects and advantages of this disclosure are further illustrated by the following examples, but the particular materials and amounts thereof recited in these examples, as well as other conditions and details, should not be construed to unduly limit this disclosure. These examples are merely for illustrative purposes only and are not meant to be limiting on the scope of the appended claims.

TABLE 1

| Materials | | |
|---|---|---|
| Description | Source | Location |
| Ammonium fluoride | Honeywell | Germany |
| Ammonia water solution 30% | J. T. Baker | Central valley, PA |
| BisGMA (2,2-bis[4-(2-hydroxy-3-methacryloyloxypropoxy)phenyl]propane) | | CAS Reg. No. 1565-94-2 |
| HEMA (2-hydroxyethyl methacrylate) | ESSTECH, Inc. | Essington, PA, USA |
| IRGACURE 819 (CAS 162881-26-7) | Sigma Aldrich | St Louis, MO, USA |
| L-arginine, free base | MP biomedicals LLC | Solon, OH, USA |
| PERIDEX Chlorhexidine Gluconate | 3M ESPE | St Paul, MN, USA |

TABLE 1-continued

Materials

| Description | Source | Location |
|---|---|---|
| 0.12% Oral Rinse | | |
| SDF, commercially available as ADVANTAGE ARREST silver diamine fluoride solution, 38% | Elevate Oral Care | West Palm Beach, FL, USA |
| Zinc citrate trihydrate | Jungbunzlauor | Basel, Switzerland |
| Zinc potassium fluoride | City Chemical LLC | West Haven, CT, USA |

Examples EX1 to EX10 and Comparative Examples CE1 to CE4

All example components were added into a plastic centrifuge tube. Compositions were mixed well by a vortex mixer to form a suspension. Mixtures were then heated to 60° C. and continued to be mixed several times. Mixtures were kept in a 60° C. oven for 24 hours. Example mixtures were vortex mixed several times during warming in 60° C. oven to form solutions. Comparative examples (CE) did not form solution; the zinc citrate and zinc potassium fluoride could not dissolve in the solution and these comparative examples exhibited low water solubility compared with examples.

TABLE 2

EXAMPLES EX1 to EX5 and COMPARATIVE EXAMPLES CE1 and CE2

| Components | EX1 | EX2 | EX3 | EX4 | EX5 | CE1 | CE2 |
|---|---|---|---|---|---|---|---|
| zinc citrate trihydrate | 41.7 | 43.5 | 40.8 | 40.0 | 29.4 | 46.5 | 0 |
| $NH_3$ water solution 30% | 41.7 | 43.5 | 40.8 | 44.0 | 0 | 0 | 0 |
| $NH_4F$ | 16.7 | 13.0 | 18.4 | 16.0 | 11.8 | 0 | 0 |
| water | 0 | 0 | 0 | 0 | 29.4 | 53.5 | 48.3 |
| L-arginine | 0 | 0 | 0 | 0 | 29.4 | 0 | 51.7 |
| Zinc potassium fluoride | 0 | 0 | 0 | 0 | 0 | 0 | 0 |
| Total | 100 | 100 | 100 | 100 | 100 | 100 | 100 |
| pH (measured with 1-14 pH paper) | 10 | 10 | 10 | 10 | 9 | NA | NA |
| Zinc % | 12.9 | 13.4 | 12.7 | 12.4 | 9.1 | NA | NA |
| Fluoride % | 8.6 | 6.7 | 9.4 | 8.2 | 6.0 | NA | NA |
| Total water % | 29.1 | 30.4 | 28.6 | 30.8 | 29.4 | 53.5 | 51.7 |
| formed solution after reaction at 60° C. | Yes | Yes | Yes | Yes | Yes | No | No |

TABLE 3

EXAMPLES EX6 to EX10 and COMPARATIVE EXAMPLES CE3 and CE4

| Components | EX6 | EX7 | EX8 | EX9 | EX10 | CE3 | CE4 |
|---|---|---|---|---|---|---|---|
| zinc citrate trihydrate | 25.8 | 26.5 | 27.6 | 24.2 | 21.6 | 34.8 | 0 |
| $NH_3$ water solution 30% | 0 | 0 | 0 | 0 | 0 | 0 | 60.0 |
| $NH_4F$ | 9.7 | 9.9 | 10.3 | 9.1 | 8.1 | 13.0 | 0 |
| water | 38.7 | 39.7 | 34.5 | 42.4 | 48.7 | 52.2 | 0 |
| L-arginine | 25.8 | 23.8 | 27.6 | 24.2 | 21.6 | 0 | 0 |
| Zinc potassium fluoride | 0 | 0 | 0 | 0 | 0 | 0 | 40.0 |
| Total | 100 | 100 | 100 | 100 | 100 | 100 | 100 |
| pH (measured with 1-14 pH paper) | 9 | 9 | 9 | 9 | 9 | NA | NA |
| Zinc % | 8.0 | 8.2 | 8.6 | 7.5 | 6.7 | NA | NA |
| Fluoride % | 5.0 | 5.1 | 5.3 | 4.7 | 4.2 | NA | NA |
| Total water % | 38.7 | 39.7 | 34.5 | 42.4 | 48.7 | 52.2 | 42.0 |
| Formed solution after reaction at 60° C. | Yes | Yes | Yes | Yes | Yes | No | No |

Remineralization and Acid Resistance Testing

Specimens of enamel were prepared from bovine teeth. Caries lesions were created in the enamel by immersing each specimen in a solution of 0.1M lactic acid and 0.2% CARBOPOL (pH=5) at 37° C. for 24 hours. The specimens were randomized to one of the following treatment liquids: artificial saliva (used as a control), silver diamine fluoride (SDF) as a comparative solution, EX1, EX2, and EX3. A total of 10 specimens per treatment solution were prepared.

The specimens were treated by applying the different test treatment liquids on the enamel lesion with a mini dental bush, rubbing the lesion with the mini dental brush for 10 seconds, waiting for one minute, rinsing with artificial saliva, and storing in artificial saliva for 30 minutes at 37° C. Specimens were then rinsed with artificial saliva again and placed in fresh artificial saliva for 24 hours at 37° C.

The surface hardness (Vickers Hardness Number (VHN)) of treated specimens was measured by a Vickers hardness tool. The average VHN and standard deviation of the 10 specimens per treatment were calculated.

To measure the retention of the surface micro-hardness, the specimens were next placed in a solution of 0.1M lactic acid and 0.2% CARBOPOL (pH=5) for 24 hours to create a demineralization challenge. The retention of any increased hardness was evaluated via acid challenge. Samples were subjected to demineralization solution for 24 hours. Retention of micro-hardness following the acid challenge indicates an ability of the treatment to resist demineralization. Surface micro-hardness was measured following the acid challenge. Micro-hardness values that were higher than baseline measurements indicated remineralization of tooth enamel by the treatment. The specimens were stored in artificial saliva for 24 hours at 37° C., and then hardness was measured. The specimens were acid challenged by demineralization solution and the hardness were measured again. The more resistant the enamel to the challenge, the higher the retention of the surface micro-hardness value. Surface micro-hardness was measured using the same procedure as with the baseline measurement. Any increase in micro-hardness after treatment indicates an ability of the treatment solution to remineralize tooth enamel.

TABLE 4

Enamel Micro-hardness (VHN) and Remineralization Testing Results

| Treatment | Saliva Control | SDF | EX 1 | EX 2 | EX 3 |
|---|---|---|---|---|---|
| Baseline Average | 45.6 | 45.9 | 46.8 | 47.3 | 47.7 |
| Baseline Std. Dev. | 7.1 | 7.3 | 7.3 | 7.2 | 7.2 |
| Treatment Average | 61.5 | 75.8 | 81 | 97.5 | 102.4 |
| Treatment Std. Dev. | 12.5 | 16.4 | 11.8 | 19.1 | 19.5 |
| Acid Challenge Average | 46.1 | 68.2 | 55.1 | 72.8 | 77.1 |
| Acid Challenge Std. Dev. | 9.9 | 16.3 | 9.5 | 16.1 | 22.5 |
| Saliva Remin. Average | 57 | 88.0 | 84.2 | 92.9 | 115.6 |
| Saliva Remin. Std. Dev. | 12.7 | 22.3 | 10.1 | 22.3 | 23.9 |
| Second Acid Challenge Average | 42.2 | 68.4 | 54.9 | 73.9 | 80.8 |
| Second Acid Challenge Std. Dev. | 8.5 | 15.7 | 10.3 | 15.8 | 21.7 |

Fluoride Uptake Testing

Specimens of enamel were prepared from bovine teeth. Caries lesions were created in the enamel by immersing each specimen in a solution of 0.1M lactic acid and 0.2% CARBOPOL (pH=5) at 37° C. for 24 hours. The specimens were randomized to one of the following treatment liquids: artificial saliva (used as a control), silver diamine fluoride (SDF) used as a comparison, EX1, EX2, and EX3. A total of 10 specimens per treatment group were prepared.

The specimens were treated by applying the different test treatment liquids on the enamel lesion with a mini dental bush, rubbing the lesion with the mini dental brush for 10 seconds, waiting for one minute, rinsing with artificial saliva, and storing in artificial saliva for 30 minutes at 37° C. Specimens were then rinsed with artificial saliva again and placed in fresh artificial saliva for 24 hours at 37° C.

Microdrill biopsies were taken of each specimen to measure the amount of fluoride transferred to the enamel. To test the fluoride incorporation into the tooth, specimens were further subjected to an acid challenge. Specimens were placed into a solution of 0.1M lactic acid and 0.2% CARBOPOL (pH=5) at 37° C. for 24 hours to simulate an acid challenge. Microdrill biopsies were taken from each specimen to measure the amount of fluoride in the enamel following acid challenge. Results in units of µg F/cm$^2$ are reported in Table 5.

TABLE 5

Fluoride Uptake (µg F/cm$^2$) After Example Solution Treatments

| Treatment | Treatment Average (µg F/cm$^2$) | Treatment Std. Dev. | Acid Challenge Average (µg F/cm$^2$) | Acid Challenge Std. Dev. |
|---|---|---|---|---|
| Saliva control | 2.29 | 1.01 | 3.38 | 1.50 |
| SDF | 16.44 | 3.21 | 14.07 | 1.68 |
| EX 1 | 15.46 | 3.20 | 8.72 | 3.03 |
| EX 2 | 10.34 | 4.41 | 7.93 | 2.21 |
| EX 3 | 14.22 | 2.93 | 12.26 | 3.56 |

Examples EX11 to EX13 and Comparative Example CE5

Additional examples were prepared using commercially available SDF in combination with the zinc complex solution of example EX3. The following examples illustrate the use of example compositions on tooth surfaces. Bovine teeth samples were prepared in the following manner to serve as a test surface for example treatments. Bovine teeth were held in an acrylic mold and polished with 120 grit sand paper to expose the dentin, then polished with 320 grit sandpaper to smooth the dentin surface. One drop of each example composition was placed on a prepared bovine dentin surface and then exposed to a blue LED light using 3M ELIPAR DEEPCURE-S LED curing light, (available from 3M Company of St. Paul, MN, USA) with maximum wavelength 450 nm and output approximately 1500 mW/cm$^2$ for 20 seconds. Examples EX11-EX13 demonstrates that while silver diamine fluoride can be used as an additional source of fluoride and will have the antimicrobial benefit of zinc in the composition, the final condition is less aesthetically pleasing than examples that do not turn black when exposed to light, such as EX3.

TABLE 6

EXAMPLES EX 11 to EX 13 and COMPARATIVE EXAMPLE CE 5

| Components | EX 11 | EX 12 | EX 13 | EX 3 | CE 5 |
|---|---|---|---|---|---|
| EX 3 | 76.9 | 62.5 | 50 | 100 | 0 |
| SDF | 23.1 | 37.5 | 50 | 0 | 100 |
| Total | 100 | 100 | 100 | 100 | 100 |
| Formed solution | Yes | Yes | Yes | Yes | Yes |
| Turned black on tooth after blue light exposure | Yes | Yes | Yes | No | Yes |

Examples EX14 and Comparative Example CE6

Additional examples were prepared by combining the zinc fluoride complex of EX3 or SDF with a photo-curable methacrylate mixture.

TABLE 7

EXAMPLE EX 14 and COMPARATIVE EXAMPLE CE 6

| Components | EX 14 | CE 6 |
|---|---|---|
| EX 3 | 28.5 | 0 |
| SDF | 0 | 9.1 |
| HEMA | 35.4 | 45 |
| BisGMA | 35.4 | 45 |
| IRGACURE 819 | 0.7 | 0.9 |
| Total | 100 | 100 |
| Cured into hard material after light exposure | Yes | Yes |
| Turned black on tooth after light exposure | No | Yes |

Zone of Inhibition Antimicrobial Test

A multispecies zone of inhibition test was performed according to the following steps in order to assess antimicrobial efficacy of examples. Human saliva was used as the source of bacteria.

1. Sterilized 6 mm diameter round filter paper disks were used.
2. Experimental and control solutions were dispensed into standard 96 well plates in preparation to soak the filter paper disks.
3. Each sterilized paper disk was soaked by applying 10 µL of corresponding solution to the disks. Each sample was done in triplicate and final results were averaged.
4. Agar plates were divided into equal sections according to the number of solutions to be tested. Sections were marked with the names of the test solutions.
5. The agar plate lid was lifted off and the soaked filter paper samples were place onto the agar. Each sample filter paper disk was then gently pushed down to ensure complete contact of the filter paper disk with the agar surface. Caution was taken to not move a disk once it contacted the agar surface.

6. The analyst continued to place one sample disk at a time onto the agar surface until all disks were placed into their respective sections of each agar plate, as described above.

7. Once all disks were in place, the lid was replaced, the agar plates were inverted, and placed in a 37° C. air incubator for 24 hours.

8. After 24 hours incubation at 37° C., the diameter of each zone of inhibition was measured to the nearest millimeter using a ruler or calipers. The zones of inhibition were measured as the diameter from the edges of the last visible colony, according to the unaided eye.

9. During measurements, care was taken to not touch the disk or surface of the agar. The ruler was decontaminated between each measurement; measurements were performed in a biosafety cabinet.

TABLE 8

Zone of Inhibition Antimicrobial Testing Results

| Sample | Zone of Inhibition Diameter Ave. (mm) | Std. Dev. (n = 3) |
|---|---|---|
| 0.9% Saline Solution | 6 | 0 |
| CHG Rinse | 11 | 1 |
| SDF | 13 | 0 |
| EX 1 | 17 | 2 |
| EX 2 | 18 | 0 |
| EX 3 | 17 | 4 |
| EX 4 | 17 | 1 |
| EX 11 | 14 | 1 |
| EX 12 | 14 | 2 |
| EX 13 | 14 | 1 |

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

What is claimed is:

1. A dental composition comprising:
a zinc carboxylate;
an amine-containing ligand;
a source of fluoride anion effective to provide fluoride in an amount of at least 4 wt % with respect to the weight of the dental composition; and
water,
wherein:
the dental composition has a pH of at least 8, and
the dental composition is a homogenous solution at a temperature of about 20-25° C.

2. The dental composition of claim 1, consisting essentially of the zinc carboxylate, the amine-containing ligand, the source of fluoride, and water.

3. The dental composition of claim 1, wherein the zinc carboxylate is selected from zinc citrate, zinc gluconate, zinc maleate, zinc acetate, zinc fumarate, zinc adipate, zinc propionate, hydrates thereof, and combinations thereof.

4. The dental composition of claim 1, wherein the zinc carboxylate is zinc citrate.

5. The dental composition of claim 1, wherein the amine-containing ligand is selected from one or more of an amino acid and ammonia.

6. The dental composition of claim 1, wherein the amine-containing ligand is an amino acid selected from histidine, isoleucine, leucine, lysine, tyrosine, tryptophan, methionine, phenylalanine, aspartic acid, glycine, arginine, glutamic acid, valine, alanine, threonine, cysteine, proline, asparagine, and combinations thereof.

7. The dental composition of claim 1, wherein the amino acid is arginine.

8. The dental composition of claim 1, consisting essentially of the zinc carboxylate, the amine-containing ligand, the source of fluoride, and water, wherein the amine-containing ligand is ammonia and optionally arginine.

9. The dental composition of claim 1, wherein the source of fluoride anion is selected from sodium fluoride, ammonium fluoride, silver fluoride, stannous fluoride, potassium fluoride, and combinations thereof.

10. The dental composition of claim 1, wherein the source of fluoride anion is ammonium fluoride.

11. The dental composition of claim 1, wherein the amine-containing ligand is present in amount between about 5 wt % and about 30 wt % with respect to the weight of the dental composition.

12. The dental composition of claim 1, wherein the zinc carboxylate is present in an amount effective to provide zinc in about 5 wt % to about 15 wt % with respect to the weight of the dental composition.

13. The dental composition of claim 1, wherein the water is present in an amount of about 20 wt % to about 50 wt % with respect to the weight of the dental composition.

14. The dental composition of claim 1, wherein the zinc carboxylate and amine-containing ligand is present in amounts to provide a zinc carboxylate: amine-containing ligand mol ratio of greater than about 1:2.

15. A method for treating or preventing caries activity on a tooth surface, the method comprising:
providing the dental composition of claim 1; and
contacting the dental composition to the tooth surface.

16. The method of claim 15, wherein the contacting comprises applying the dental composition with a dropper, needle, pipette, tray, or swab.

17. A kit comprising:
a dental composition of claim 1; and
a set of instructions directing a user to contact the dental composition to a tooth surface.

18. A dental composition comprising:
a zinc carboxylate present in an amount to provide zinc in an amount of 5 wt % to 15 wt % with respect to the weight of the dental composition;
one or more amine-containing ligand present in an amount of 5 wt % to 30 wt % with respect to the weight of the dental composition,
the one or more amine-containing ligand selected from ammonia and an amino acid;
a source of fluoride anion present in an amount effective to provide fluoride in an amount of at least 4 wt % with respect to the weight of the dental composition; and
water present in an amount of 20 wt % to 50 wt % with respect to the weight of the dental composition,
wherein the dental composition is a homogenous solution at a temperature of about 20-25° C.

19. The dental composition of claim 18, wherein one or more of:
the zinc carboxylate is zinc citrate;
the amino acid is arginine;

the source of fluoride anion is ammonium fluoride; and
the source of fluoride anion is present in an amount to provide fluoride in an amount of 6 to 10 wt %.

20. The dental composition of claim 18, consisting essentially of the zinc carboxylate, the one or more amine-containing ligand, the source of fluoride anion, and water, wherein the one or more amine-containing ligand is ammonia and optionally arginine, and the source of fluoride anion is ammonium fluoride.

* * * * *